United States Patent [19]

Niedzwiecki et al.

[11] Patent Number: 4,853,002
[45] Date of Patent: Aug. 1, 1989

[54] PROCESS FOR REMOVING HYDROGEN SULFIDE FROM WASTE WATER

[75] Inventors: Joseph L. Niedzwiecki, Fanwood; Ralph G. Wolfe, East Brunswick, both of N.J.

[73] Assignee: Exxon Research and Engineering Company, Florham Park, N.J.

[21] Appl. No.: 181,828

[22] Filed: Apr. 15, 1988

Related U.S. Application Data

[63] Continuation of Ser. No. 849,129, Apr. 7, 1986, abandoned.

[51] Int. Cl.$^4$ ................................................ C02F 1/20
[52] U.S. Cl. .......................................... 55/19; 55/55; 210/750
[58] Field of Search ................. 210/750, 766; 55/46, 55/55, 19; 423/563; 208/183, 184

[56] References Cited

U.S. PATENT DOCUMENTS

| | | | |
|---|---|---|---|
| 1,918,153 | 7/1933 | Wagner | 423/563 |
| 1,964,487 | 6/1934 | Smith | 210/750 |
| 2,002,654 | 5/1935 | Bierbaum | 423/563 |
| 3,898,058 | 8/1975 | McGill | 55/50 |
| 4,410,432 | 10/1983 | Domahidy | 210/750 |
| 4,551,158 | 11/1985 | Wagner et al. | 55/46 |

Primary Examiner—Peter Hruskoci
Attorney, Agent, or Firm—Marthe L. Gibbons; Chris P. Konkol

[57] ABSTRACT

Hydrogen sulfide is removed form a water stream comprising hydrogen sulfide and a high concentration of a Group IIA metal component such as magnesium and calcium components by maintaining the water stream at a specific acidic pH range and a specified temperature, and subjecting the resulting acidified hot water stream to vacuum flashing, in the absence of a stripping gas.

5 Claims, 1 Drawing Sheet

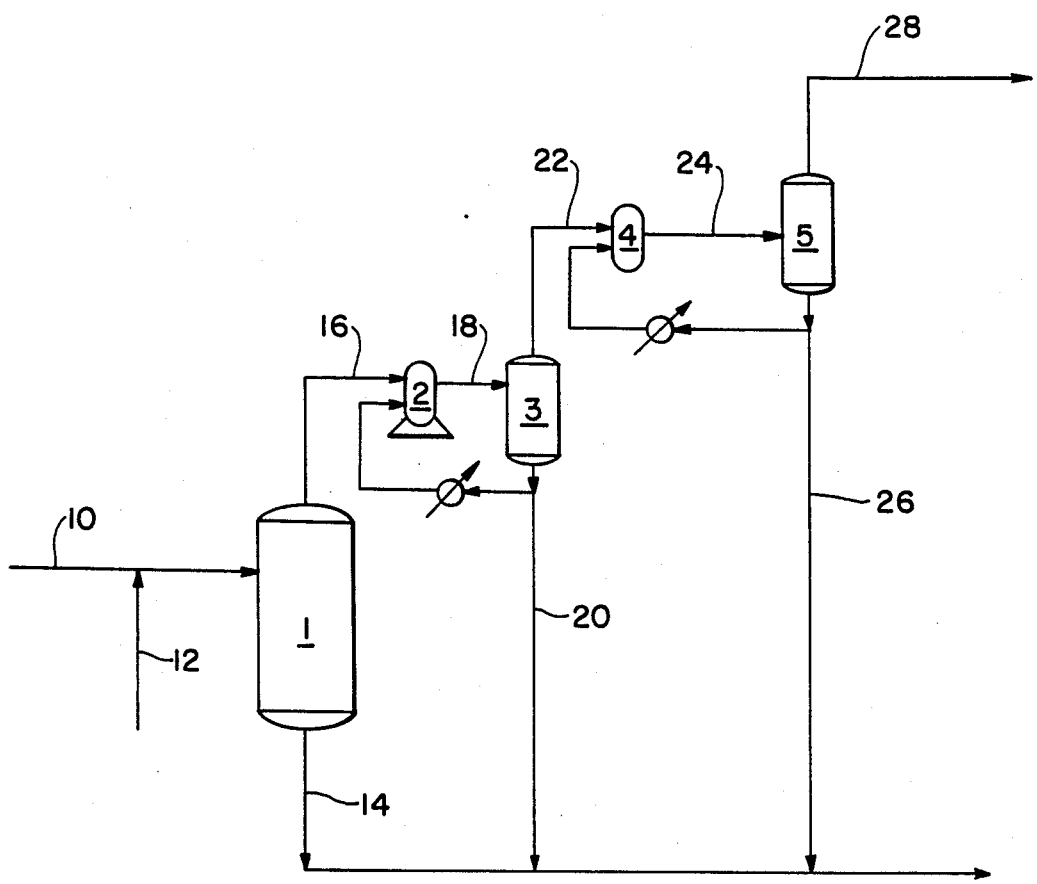

PROCESS FOR REMOVING HYDROGEN SULFIDE FROM WASTE WATER

This is a continuation of Ser. No. 849,129 filed 4/7/86, now abandoned.

BACKGROUND OF THE INVENTION

1. Field of the Invention

This invention relates to a process for removing hydrogen sulfide from a waste water stream.

2. Description of Information Disclosures

Processes for removing volatilizable contaminants from a water stream by vacuum flashing are known.

U.S. Pat. No. 3,898,058 discloses removing hydrocarbons and other contaminants from a contaminated water stream by introducing a hot contaminated water stream into a contacting vessel and applying a vacuum to the vessel to separate the hydrocarbons and other contaminants from the waste water. It further discloses that when hydrogen sulfide is to be removed as a water contaminant or when the contaminant is carbon dioxide, the pH of the water is lowered to an acid condition prior to vacuum flashing.

U.S. Pat. No. 4,551,158 discloses removing hydrogen sulfide from a spent aqueous amine-containing absorbent without the use of a stripping column by flashing the spent absorbent in two or more flash stages in which a final stage is operated under reduced pressure of, for example, 0.5 to 1 bar.

When the hydrogen sulfide-containing water stream which is to be treated comprises a high concentration of alkali metal components, such as salts, treatment of such water poses addition problems to avoid equipment plugging due to salt deposition.

It has now been found that salt deposition can be minimized and the desired level of hydrogen sulfide removal achieved by controlling the pH and the temperature of the hydrogen sulfide-containing water stream within specified ranges.

SUMMARY OF THE INVENTION

In accordance with the invention there is provided, a process for removing hydrogen sulfide from a water stream comprising hydrogen sulfide or a hydrogen sulfide precursor and a high concentration of an alkali metal component, which comprises the steps of: (a) maintaining said water stream at a temperature ranging from about 50° F. to about 200° F. and at a pH ranging from about 3.5 to about 6; (b) subjecting the water stream resulting from step (a), in the absence of a stripping gas, to a reduced pressure sufficient to remove by volatilization at least a portion of said hydrogen sulfide from said water stream.

BRIEF DESCRIPTION OF THE DRAWING

The drawing is a schematic flow plan of one embodiment of the invention.

DESCRIPTION OF THE PREFERRED EMBODIMENT

Referring to the figure, a water stream comprising hydrogen sulfide or a hydrogen sulfide precursor and a high concentration of a Group IIA metal component of the Periodic Table of Elements, such as calcium and magnesium components, is passed by line 10 into flash zone 1. The Periodic Table of Elements referred to herein is given in *Handbook of Chemistry and Physics*, published by the Chemical Rubber Publishing Co., Cleveland, Ohio, 45th Edition, 1964. An acid is introduced into line 10 by line 12. Suitable water streams from which hydrogen sulfide can be removed by the process of the present invention include waste water streams comprising from above about 0 to about 5 wt.% hydrogen sulfide or a hydrogen sulfide precursor, such as compounds which under the treatment condition will be converted to hydrogen sulfide, and at least about 80 mg/l of a Group IIA metal component, particularly calcium and magnesium, preferably from about 150 mg/l to the limit of solubility of said Group IIA metal component, calculated as elemental metal. The waste water to be treated may be derived from any source, such as petroleum refining processes, petrochemical processes, food industry, etc. The process of the invention is particularly suited to treat waste water derived by separating water from crude oil at the production well. Such water comprises a high concentration not only of Group IIA metal components but also alkali metal components such as sodium and potassium components. The alkali metal components in such water may generally be present in an amount above 600 mg/l, typically above 1,000 mg/l, calculated as elemental metal. Organic pollutants such as hydrocarbonaceous oils and greases may also be present in the waste water to be treated.

The acid added by line 12 is added in an amount sufficient to maintain the pH of the water stream of line 10 at an acid pH ranging from about 3.5 to about 6, preferably from about 5 to about 6. Suitable acids for use in acidification include strong inorganic acids such as acids having at least one pKa of not more than 6, for example, hydrochloric acid, sulfuric acid, sulfurous acid, phosphoric acid, phosphorous acid and/or their thermally decomposable salts, e.g., ammonium salts of the strong acids. The term "pKa" with reference to the acid is used herein to designate the logarithm of the reciprocal of the ionization constant of the acid measured at 25° C. When the acid is a polybasic acid, and therefore, has several ionization constants, at least one of the pKa must be not more than 6. Ionization constants are given in Lange's *Handbook of Chemistry* published by Handbook Publishers, Sandusky, Ohio, 1952, pages 1229–1235. The acidified water stream is maintained at the temperature ranging from about 50° F. to about 200° F., preferably from about 150° to about 200° F. prior to introducing the hot acidified water stream into flash zone 1. The pressure on stream 10 prior to entering flash zone 1 will generally range from about 100 to about 200 psia (pounds per square inch absolute). Flash zone 1 may be a conventional contacting tower suitable to be operated at low pressures. Flash zone 1 is maintained at a pressure lower than the pressure on the water stream of line 10. Suitable low or reduced pressure of flash zone 1 includes a subatmospheric pressure, preferably a pressure ranging from about 2 to about 10 psia, preferably from about 3 to about 5 psia. The specific pressure to be used will depend in part on the temperature, pH and desired level of $H_2S$ removal. The temperature in flash zone 1 may range from about 100° to about 200° F., preferably from about 150° to about 175° F. Flash zone 1 may be maintained at the reduced pressure by conventional means such as mechanical pumps suited to decrease the pressure on zone 1. When the acidified $H_2S$-containing hot water stream of line 10 is subjected to the reduced pressure conditions of flash zone 1, at least a portion of the hydrogen sulfide is removed from the water as a vapor by volatilization. A stream of water comprising a decreased amount of hydrogen sulfide is removed from flash zone 1 by line 14.

The calculated amounts of components in the stream resulting from the flash tower are also shown in Table I.

TABLE I

| Stream | Initial Water | Acid[3] (HCl) | Liquid Effluent of Flash Zone |
|---|---|---|---|
| Conditions | | | |
| Temperature, °F. | 155 | — | 110 |
| Pressure, psia | ~75 | — | pumped |
| Stream Rates | | | |
| lb/hr. | 399562 | 448 | 398216 |
| GPM at 60° F. | ~800 | — | 799 |
| moles/hr | 21675 | — | 21603 |
| Stream Composition | | | |
| Group IIA metal,[1] mg/l | 250 | — | 250 |
| alkali metal,[1] wt. % | ~1.5 | — | ~1.5 |
| $H_2S$ wppm | ~400 | — | 40 |
| $CO_2$ wpm | ~900 | — | 41 |
| Total Organic Compounds, wt. % | 0.5 | — | 0.5 |
| $H_2O$, wt. % | 95.8 | — | 95.9 |
| pH at 77° F. | 8 | — | 6.2 |

Footnotes
[1] Calculated as elemental metal.
[2] pH of acidified water was 5.6
[3] 100% HCl assumed.

A gaseous effluent comprising the hydrogen sulfide that was removed from the water stream is removed from flash zone 1 by line 16 and passed into liquid ring vacuum pump 2. The gaseous effluent of liquid ring vacuum pump 2 comprising condensable liquid is passed by line 18 into separator 3 to separate the liquid from the gaseous phase. The condensed liquid portion is removed from separator 3 by line 20. The gaseous effluent of separator 3 is passed by line 22 into compressor 4. The effluent of compressor 4 comprising condensable liquid is passed by line 24 to separator 5 to separate the liquid from the gaseous phase. The condensed liquid is removed from separator 5 by line 26. The gaseous effluent comprising hydrogen sulfide is removed from separator 5 by line 28 for further treatment, if desired, by conventional means. Liquid streams 14, 20 and 26 may be combined.

EXAMPLE

The following prophetic example (i.e., paper example) is provided to illustrate the invention.

A water stream comprising the components shown in Table I is acidified by the addition of hydrochloric acid to a pH of 5.6 at 77° F. The acidified water stream is heated to a temperature of about 155° F. and passed to a vacuum flash tower in the absence of an added stripping gas, such as steam. The flash tower is maintained at a temperature of about 150° F. and at a pressure of 4.25 psia. The estimated composition of the water stream resulting from the flash tower is also shown in Table I.

What is claimed is:

1. A process for removing hydrogen sulfide from a water stream, derived by separating water from crude oil at the production well, said water stream comprising hydrogen sulfide or a hydrogen sulfide precursor and a concentration of at least about 1000 mg/L of a Group IIA metal component of the Periodic Table of Elements, which process comprises the steps of: (a) maintaining said water stream at a temperature ranging from about 150° F. to about 200° F. and at a pH ranging from about 5 to about 6; (b) subjecting the water stream resulting from step (a), in the absence of a stripping gas, to a pressure ranging from about 3 to about 10 psia, whereby at least a portion of said hydrogen sulfide is removed by volatilization from said water stream and whereby salt deposition is minimized.

2. The process of claim 1 wherein said pH is maintained within said range by adding a strong inorganic acid to said water stream.

3. The process of claim 1 wherein said water stream prior to being subjected to said reduced pressure is under a pressure ranging from about 100 to about 200 psia.

4. The process of claim 1 wherein said water stream comprising said hydrogen sulfide additionally comprises organic pollutants.

5. The process of claim 1 wherein step (b) is conducted in a flash zone, said zone being maintained at a temperature ranging from about 150° to about 175° F.

* * * * *